United States Patent [19]
Jespersen et al.
[11] 4,375,048
[45] Feb. 22, 1983

[54] PROGRAMMABLE TIME SWITCH

[75] Inventors: Aksel Jespersen, Sønderborg; Peter A. Eriksen, Nordborg, both of Denmark

[73] Assignee: Danfoss A/S, Nordborg, Denmark

[21] Appl. No.: 208,808

[22] Filed: Nov. 14, 1980

Related U.S. Application Data

[63] Continuation of Ser. No. 53,105, Jun. 28, 1979, abandoned.

[30] Foreign Application Priority Data

Jul. 11, 1978 [DE] Fed. Rep. of Germany ....... 2830368

[51] Int. Cl.³ ............................................ H02P 5/16
[52] U.S. Cl. ................................ 318/484; 307/141.8
[58] Field of Search ............... 318/696, 305, 318, 484; 307/141.4, 141.8

[56] References Cited

U.S. PATENT DOCUMENTS

| | | | |
|---|---|---|---|
| 3,005,940 | 10/1961 | Johnson | 318/305 |
| 3,215,918 | 11/1965 | Lichowsky | 318/305 X |
| 3,646,417 | 2/1972 | Cassie et al. | 318/318 |
| 4,084,122 | 4/1978 | Gettings | 318/696 |

*Primary Examiner*—B. Dobeck
*Attorney, Agent, or Firm*—Wayne B. Easton

[57] ABSTRACT

The invention relates to a time switch assembly of the type having an electric stepping motor, a pulse generator and a connecting drive therebetween for driving the motor at speeds corresponding to the frequency of the pulse generator. A time plate is driven by the motor and a scanning switching circuit is responsive to different speeds of the time plate. First and second counters in series are provided between the pulse generator and the motor. A switching device between the counters provides selectable bypassing of the second counter so that the motor may be driven at a speed corresponding to the output of only the first counter or at a slower speed corresponding to a slower counter output of the two counters operating in series.

1 Claim, 1 Drawing Figure

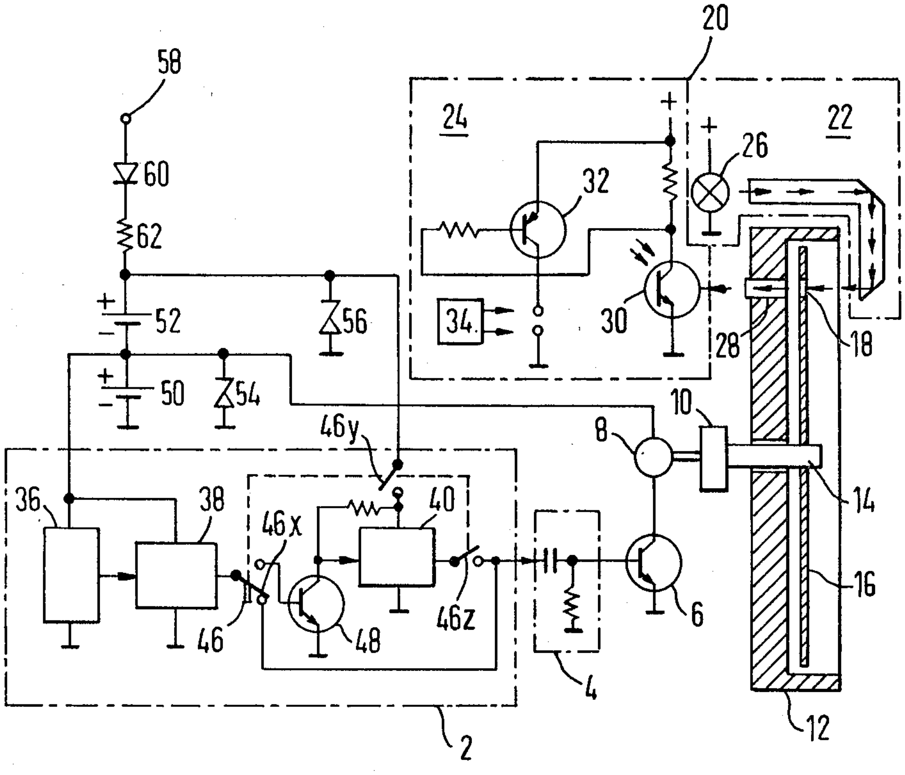
58
60
62
52
56
50
54
46y
36
38
40
46x
46
48
46z
2
4
6
8
10
14
16
12
18
28
20
24
22
26
32
30
34.

PROGRAMMABLE TIME SWITCH

This is a continuation of application Ser. No. 53,105, filed June 28, 1979 now abandoned.

The invention relates to a programmable timeswitch comprising a pulse generator, a motor driven at a predetermined speed by the pulse generator, a time plate driven by the motor and having successive zones with alternately different properties in the circumferential direction, and at least one scanning switching circuit responsive with different switching conditions to the different properties.

In a known programmable timeswitch of this kind, the motor is a synchronous motor operated by AC mains voltage and driving the time plate through gearing. If the switching programme is to be changed from a cyclic daily programme to a cyclic weekly programme, the gears of the gearing must be exchanged so that the time plate turns once per week instead of once per day. Replacement of the gears requires the use of a special and correspondingly complicated change gearing and the availability of different gears. In addition, it is time-consuming and cumbersome. Since the mains frequency is not particularly constant, a marked time error occurs after a prolonged period. The time error can be particularly large if the mains voltage in temporarily absent. This time error may possibly remain unnoticed for an extensive period. To counteract the absence of mains voltage, timeswitches with a so-called 'power reserve' (auxiliary clockwork with spring drive) are known which operate automatically as soon as there is a mains failure but this represents an additional expense.

The invention is based on the problem of providing a timeswitch of the aforementioned kind in which the switching programme can be altered in a simple manner and which permits highly accurate operation at little expense.

According to the invention, this problem is solved in that the pulse generator comprises an oscillator, a first counter downstream of the oscillator, a switching device, and a second counter which can be interposed between the first counter and the motor or be bridged.

In a timeswitch constructed in this way, the simple interpositioning of the second counter between the first counter and the motor can step down the frequency of the pulses driving the motor corresponding to the step down ratio of the second counter, so that the motor will turn at a correspondingly slower speed. Conversely, by bridging the interposed second counter the speed of the motor can be increased back to the original value. The oscillator may be a conventional commercially available oscillator with a highly constant frequency. Similarly, commercially available circuits may be provided as counters. This permits economical production of the timesswitch.

If the successive zones of the time plate have different optical properties and the scanning and switching circuit is light-sensitive, the oscillator, the counters and the motor may be battery-operated. Light-electric scanning of the time plate takes place without contact and therefore without frictional losses so that prolonged energy-conserving operation is ensured with battery-operation, whilst no unpredictable operating failure can occur as for mains operation.

If the counters are in the form of integrated circuits and a switching transistor is provided between the second counter and the motor, particularly energy-conserving operation is ensured because integrated circuits may have a low power but will operate with a comparatively low energy. The operating power required for the motor is, however, ensured by the switching transistor which for its part has a low power loss. In addition, integrated circuits can be particularly economically manufactured because components can be employed as are required in large numbers in the clock industry.

A differentiating element is preferably provided between the second counter and the motor. The differentiating element shortens the effective output pulses of the counter so that the motor receives correspondingly short operating pulses of which the power is just sufficient to drive it intermittently so that the operating voltage source is not unnecessarily loaded.

Next, the second counter may be separated from the operating voltage by the switching device while the first counter operates the motor. In this way one ensures that the second counter is not a load on the operating voltage source when it is not required.

The time plate may have at least one recess and the scanning circuit may be in the form of a light barrier through the light beam path of which the time plate is movable with the recess. This provides a high scanning sensitivity in comparison with scanning by light reflection because the light beams allowed to pass by the recess impinge directly on the light receiver without the loss of light energy as in the case of reflection. A lower operating power of the light emitter and/or the light receiver may possibly be sufficient.

It is particularly favourable if the oscillator is crystal-controlled because this not only ensures a high frequency constancy of the oscillator but also permits the use of low-loss components which are required in large numbers by the clock industry and can therefore be produced economically.

The drawing diagrammatically illustrates a preferred example of the time switch according to the invention.

The illustrated time switch contains a pulse generator 2 which drives a stepping switching motor 8 at a predetermined speed by way of a differentiating element 4 and a switching transistor 6. By way of gearing 10, the motor 8 drives a shaft 14 which is rotatably mounted in a stationary housing 12 and on which a time disc 16 of opaque material is removably secured against rotation. The time disc 16 comprises throughgoing recesses 18 in the form of penetrating apertures which could also be recesses formed at the rim of the disc and are arranged behind each other in the peripheral direction of the time disc 16. The recesses 18 together with the webs of the time disc 16 disposed between them in the circumferential direction form zones with alternately different optical properties, namely light penetrating and opaque zones. On rotation of the time disc 16, these zones move through the light path of a scanning switching circuit 20 which is in the form of a light barrier and comprises a light emitter 22 and a light receiver 24.

The light emitter 22 contains a lamp 26 and a piece of acryl glass secured on the housing 12 and directs the light rays of the lamp 26 onto the time disc 16 at the level of the recesses 18 and a diaphragm aperture 28 formed in the housing 12.

The light receiver 24 contains a photo-transistor 30 (or photo-resistor or a photo-diode) which, in series with a fixed resistor, is applied to an operating voltage and controls a switching translator 32 which is likewise applied to the operating voltage. A servo-element 34 can be connected in series with the switching transistor 32; in this example, it conserves energy by reducing the desired value of a temperature-controlled heating installation at night time or, depending on the choice of switching programme on the time switch, at weekends.

For the purpose of selecting the two switching programmes, namely reduction of the temperature every night or every weekend, the output pulse frequency of the pulse generator 2 can be changed. For this purpose the pulse generator 2 contains a crystal-controlled oscillator 36 which is therefore extremely stable in frequency and the pulses of which have a frequency of 4,194,304 Hz and are fed to a first counter 38 downstream thereof. The counter 38 is in the form of an integrated circuit and consists of twenty-three consecutive binary counting stages so that the frequency of the output pulses of the counter 38 is only 4,194,304 Hz times $2^{-23}$ =0.5 Hz.

Further, the pulse generator 2 contains a second counter 40 in the form of an integrated circuit which reduces the frequency of the pulses fed to it to one seventh.

With the aid of a manually actuated switching device 46 comprising a reversing contact 46*x* and two operating contacts 46*y* and 46*z*, the output of the first counter 38 can be connected to the input of the differentiating element 4 either directly, as illustrated, or by way of the secondcounter 40.

In the illustrated position of the switching device 46, the motor 8 is thus operated with a pulse frequency of 0.5 Hz, the step-down ratio of the gearing 10 being selected so that the time disc 16 executes one revolution in 24 hours and the servo-element 34 is actuated. The gearing 10 may be standard gearing such as that used for 12-hour clocks which are operated with one-Hz pulses.

On actuation of the switching device 46, all the contacts 46*x* to 46*z* are reversed so that the second counter 40 is applied to operating voltage and the output pulses of the first counter 38 are fed by way of the input transistor 48, which merely serves as an impedence converter, to the counting input of the second counter 40 and the differentiating element 4 or the motor 8 receives from the output of the second counter 40 pulses with a frequency of 0.5/7 Hz. The time disc 16 then requires seven days or one week for one revolution. Accordingly, the servo-element 34 is actuated only once every week.

The time disc 16 can be replaced with a time disc having a different recess width and/or recesses 18 arranged at different circumferential spacings. Further, the recesses 18 and further scanning switching circuits 20 may be provided at different radial spacings from the rotary axis of the time disc 16 so that a multitude of different time switching programmes can be set.

The crystal oscillator 36, the counter 38 and the motor 8 are conventional components of analogous crystal clocks which are operable with a rechargeable battery 50 of only about 1.5 V. In series with this battery 50 there is a like battery 52 so that the second counter 40 and the transistor 48 can be operated at 3 V. The counter 40 can likewise be a commercially available component.

The differentiating element 4 which consists of a longitudinal condenser, possibly in series with a preliminary resistor, and a transverse resistor ensures that the motor 8 receives only very short pulses which are shorter than the output pulses of the counter 38, 40 so that the battery 50 is correspondingly loaded for only short periods. The operating contacts 46*y* and 46*z* ensure that the counter 40 will not load the batteries if only the counter 38 is switched on and the counter 40 is bypassed. The batteries 50, 52 can be recharged by way of a terminal 58, a diode 60 and a preliminary resistor 62 or the arrangement may be energised from an external voltage. It is desirable for the operating voltages to be limited by zener diodes 54, 56 in parallel with the batteries.

Instead of a counter 38 with 23 binary stages there can also be a counter with only 22 stages if a motor is used which responds to only every second pulse then fed to it at a frequency of 1 Hz or use is made of gearing having a step-down ratio which is twice as large. Counter (38) with a pulse frequency divisor ratio of $1:2^{22}$, such motors and gearings are likewise conventional components in the clock industry for clocks with a 12 or 24 hour cycle. On the other hand, with an oscillator of which the frequency is only one half, one quarter, one eighth etc. of the frequency of 4,194,304 Hz, a correspondingly lower number of binary frequency dividing stages will be sufficient in the first counter 38.

What we claim is:

1. A time switch assembly, comprising, an electric stepping motor, a pulse generator, drive means for driving said motor at predetermined selected speeds corresponding to the frequency of said pulse generator, means providing single speed gearing between said motor and said time plate means, said drive means including a fixed frequency oscillator and first and second counters in series, said first counter being matched to said oscillator to have an output frequency related specifically to said speed gearing, said second counter having a divide by seven factor, and switching means between said counters to provide selectable bypassing of said second counter wherein said first counter acting alone drives said time plate through said single speed gearing at one revolution per day and said counters acting together drive said plate at one revolution per week.

* * * * *